(12) United States Patent  (10) Patent No.: US 8,564,572 B2
Park et al.  (45) Date of Patent: Oct. 22, 2013

(54) METHOD FOR AUTO ANGLE SETTING OF INFRARED SENSOR MODULE AND DISPLAY DEVICE HAVING THE SAME APPLIED THERETO

(75) Inventors: Jae-Hyun Park, Gwangju (KR);
Byung-Chun Yu, Gyeonggi-do (KR);
Shi-Cheol Song, Gyeonggi-do (KR);
Suk-Won Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 175 days.

(21) Appl. No.: 13/283,797

(22) Filed: Oct. 28, 2011

(65) Prior Publication Data

US 2012/0105376 A1  May 3, 2012

(30) Foreign Application Priority Data

Oct. 29, 2010  (KR) .................. 10-2010-0107341

(51) Int. Cl.
*G06F 3/041* (2006.01)
(52) U.S. Cl.
USPC ........................................... 345/175

(58) Field of Classification Search
None
See application file for complete search history.

(56) References Cited

U.S. PATENT DOCUMENTS 8,243,047 B2 * 8/2012 Chiang et al. ............ 345/175
2011/0102375 A1 * 5/2011 Liu et al. .................. 345/175

* cited by examiner

*Primary Examiner* — Joseph Haley
(74) *Attorney, Agent, or Firm* — Morgan, Lewis & Bockius LLP

(57) ABSTRACT

The present invention relates to a method for auto angle setting of an infrared sensor module having a light emitting unit and a sensor unit arranged at least two corners of a display panel, includes the steps of selecting a peak detection mode or a slope detection mode; in the peak detection mode, setting a pixel of in the sensor unit which senses a light quantity as a reference point corresponding to a corner other infrared sensor module is arranged at; in the slope detection mode, analyzing the light quantities of a start pixel block and an end pixel block in the sensor unit and setting a pixel which forms a greatest slope as a start point or an end point; and setting an effective angle of view in the sensor unit with reference to the reference point, the start point, and the end point.

21 Claims, 13 Drawing Sheets

METHOD FOR AUTO ANGLE SETTING OF INFRARED SENSOR MODULE AND DISPLAY DEVICE HAVING THE SAME APPLIED THERETO

CROSS REFERENCE TO RELATED APPLICATION

This application claims the benefit of the Patent Korean Application No. 10-2010-0107341, filed on Oct. 29, 2010, which is hereby incorporated by reference as if fully set forth herein.

BACKGROUND OF THE DISCLOSURE

1. Field of the Disclosure

The present invention relates to a display device which detects a touch optically, and more particularly to a method for auto angle setting of an infrared sensor module which senses a light and a display device having the same applied thereto.

2. Discussion of the Related Art

In general, a touch screen, one of interface types between a user and an information and communication device which uses various kinds of displays, is an input unit which enables interface with the device by touching a screen with a hand or a pen, personally.

Being a device that can be used by any one only by touching a button displayed on a display device with a finger, handling the touch screen conversationally and intuitively, the touch screen is applied to many fields, such as issuing machines in banks and public agencies, different medical apparatuses, tour and major facility guidance and traffic guidance.

In the touch screen, there are resistive type, capacitive type, ultrasonic wave type, infrared type, and so on depending on methods of perception.

Though above types have advantages different from one another, recently the infrared type touch screen is paid attention owing to a minimized pressure applied thereto, and convenience of arrangement.

In the meantime, a related art infrared type touch screen determines coordinates by trigonometric measurement with two sets of infrared sensors and a retro-reflective plate.

In detail, the related art infrared type touch screen has two infrared light sources and infrared sensors on an upper side of an outside of a display module and the retro-reflective plate at a third side.

In this case, the determination whether a touch is made or not is made by directing a light from the infrared light source to the retro-reflective plate to retro-reflect the light, and sensing the light shielded at the time of the touch to calculate an angle to perceive the touch.

However, since the infrared sensor in the related art infrared type touch screen is positioned on the outside of the display module, a position of the infrared sensor is liable to deviate from a normal position during transportation or fabrication of the display device, or by shaking in a case of a finished display device. Thus, if the infrared sensor is deviated, additional work and time is required for correction of the deviation before shipment, and the correction of the deviation is not possible after the shipment.

Thus, the related art infrared type touch screen has the following problems.

Before shipment of the related art infrared type touch screen, in order to prevent a touch coordinate determination error from taking place, a particular portion is touched at an initial state after assembly to store a compensation value for an angular deviation in an look-up table for performing a compensation algorithm to compensate the deviation of the infrared sensor. However, since this is an error correction limited to the initial state and the particular region, failing correction of the error taking place during use or after the initial error correction, the error causes inconvenience to the user.

And, a particular method of calculation of the compensation value for the angular deviation of the look-up table has no high reliability.

SUMMARY OF THE DISCLOSURE

Accordingly, the present invention is directed to a method for auto angle setting of an infrared sensor module, and a display device having the same applied thereto.

An object of the present invention is to provide a method for auto angle setting of an infrared sensor module in which an effective angle of view is set automatically every time a display device is driven for making touch detection possible without physical correction and without affected by deviation of a position, and a display device having the same applied thereto.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for auto angle setting of an infrared sensor module having a light emitting unit and a sensor unit arranged at least two corners of a display panel, includes the steps of selecting a peak detection mode or a slope detection mode, in the peak detection mode, setting a pixel in the sensor unit of an infrared sensor module which senses a light quantity as a reference point corresponding to a corner a corner other infrared sensor module is arranged at; in the slope detection mode, analyzing the light quantities of a start pixel block and an end pixel block in the sensor unit of each of the infrared sensor modules, and setting a pixel which forms a greatest slope as a start point or an end point; and setting an effective angle of view in the sensor unit of each of the infrared sensor modules with reference to the reference point, the start point, and the end point.

The peak detection mode includes the steps of turning on the light emitting unit in the infrared sensor module as a first output, sensing the light quantity at the sensor unit in the infrared sensor module, and analyzing the light quantity sensed thus to set a pixel which generates a direct light as the reference point.

In this instance, the step of turning on the light emitting unit in the infrared sensor module as the first output may include the step of turning on the light emitting units of the infrared sensor modules except the infrared sensor module which senses the light quantity. Or, the step of turning on the light emitting unit in the infrared sensor module as the first output may include the step of turning on the light emitting units of the infrared sensor modules at time points different from each other. Or, the step of turning on the light emitting unit in the infrared sensor module as the first output may include the step of turning on the light emitting units of the infrared sensor modules simultaneously.

In the meantime, the step of turning on the light emitting unit in the infrared sensor module as the first output may include the step of making a turning on time period of the light emitting unit of the infrared sensor module to be shorter than a time period at the time of touch position detection, or the step of making a light emission quantity from the light emitting unit of the infrared sensor module smaller than a light emission quantity at the time of touch position detection.

In this instance, the pixel which generates a direct light is a pixel showing an impulsive light quantity characteristic.

The infrared sensor module of which light emitting unit is turned on may be different from the infrared sensor module which senses the light quantity.

In the meantime, the slope detection mode includes the steps of turning on the light emitting unit in each of the infrared sensor modules as a second output higher than the first output, sensing the light quantity at the sensor unit in each of the infrared sensor modules, analyzing the light quantity sensed thus to locate a pixel which forms a greatest slope at a start pixel block and an end pixel block of the sensor unit in each of the infrared sensor modules, and setting and storing each of the pixels which forms the greatest slope as a start point or an end point.

And, the start pixel block in each of the sensor units may be initial 20~100 pixels of an entire pixels of each of the sensor units, and the end pixel block in each of the sensor units may be last 20~100 pixels of an entire pixels each of the sensor units.

The step of turning on the light emitting unit in each of the infrared sensor modules as the second output may include the step of turning on the light emitting unit in other infrared sensor modules except the infrared sensor module which senses the light quantity. Or, the step of turning on the light emitting unit in each of the infrared sensor modules as the second output may include the step of turning on the light emitting unit in each of the infrared sensor modules at time points different from each other.

The step of turning on the light emitting unit in each of the infrared sensor modules as the second output may include the step of turning on the light emitting unit in each of the infrared sensor modules simultaneously.

The step of turning on the light emitting unit in each of the infrared sensor modules as the second output may include the step of making a light emission quantity from the light emitting unit in each of the infrared sensor modules the same as the light emission quantity at the time of touch position detection.

And, in another aspect of the present invention, a method for auto angle setting of an infrared sensor module having a light emitting unit and a sensor unit arranged at least two corners of a display panel, includes the steps of turning on the light emitting unit in each of the infrared sensor modules as a first output, sensing a light quantity at the sensor unit in each of the infrared sensor modules, analyzing the light quantity sensed thus to set a pixel which generates a direct light at the sensor unit in each of the infrared sensor modules as the reference point, turning on the light emitting unit in each of the infrared sensor modules as a second output higher than the first output, sensing the light quantity at the sensor unit in each of the infrared sensor modules, analyzing the light quantity sensed thus to locate a pixel which forms a greatest slope at a start pixel block and an end pixel block of the sensor unit in each of the infrared sensor modules, setting and storing each of the pixels which forms the greatest slope as a start point or an end point, and setting an effective angle of view in the sensor unit in each of the infrared sensor modules with reference to the reference point, the start point, or the end point.

And, in another aspect of the present invention, a method for auto angle setting of an infrared sensor module having a light emitting unit and a sensor unit arranged at a corner of a display panel, includes the steps of turning on the light emitting unit, sensing a light quantity at the sensor unit, and analyzing the light quantity sensed on a start pixel block and an end pixel block in the sensor unit of the infrared sensor module, to set a pixel which forms a greatest slope in the start pixel block as a start point and a pixel which forms a greatest slope in the end pixel block as an end point.

In this instance, the method may further include the step of setting a space between the pixels respectively set as the start point and the end point of the sensor unit in the infrared sensor module as an effective angle of view matched to 0° and 90°.

And, in another aspect of the present invention, a display device includes a display panel, at least two infrared sensor modules each having a light emitting unit and a sensor unit arranged at least two corners of the display panel, a retro-reflective plate arranged at edges of the display panel, and a touch control unit having an auto angle setting unit for setting an effective angle of view with reference to pixels in the sensor unit of each of the infrared sensor modules which form impulsees by light quantity sensed with a touch position detection unit which detects a touch position.

In this instance, the retro-reflective plate at the corner having no infrared sensor module arranged thereto is diagonal treated.

And, the display device may further include a case top having the infrared sensor modules and the retro-reflective plates arranged on an inside thereof to cover edges of the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
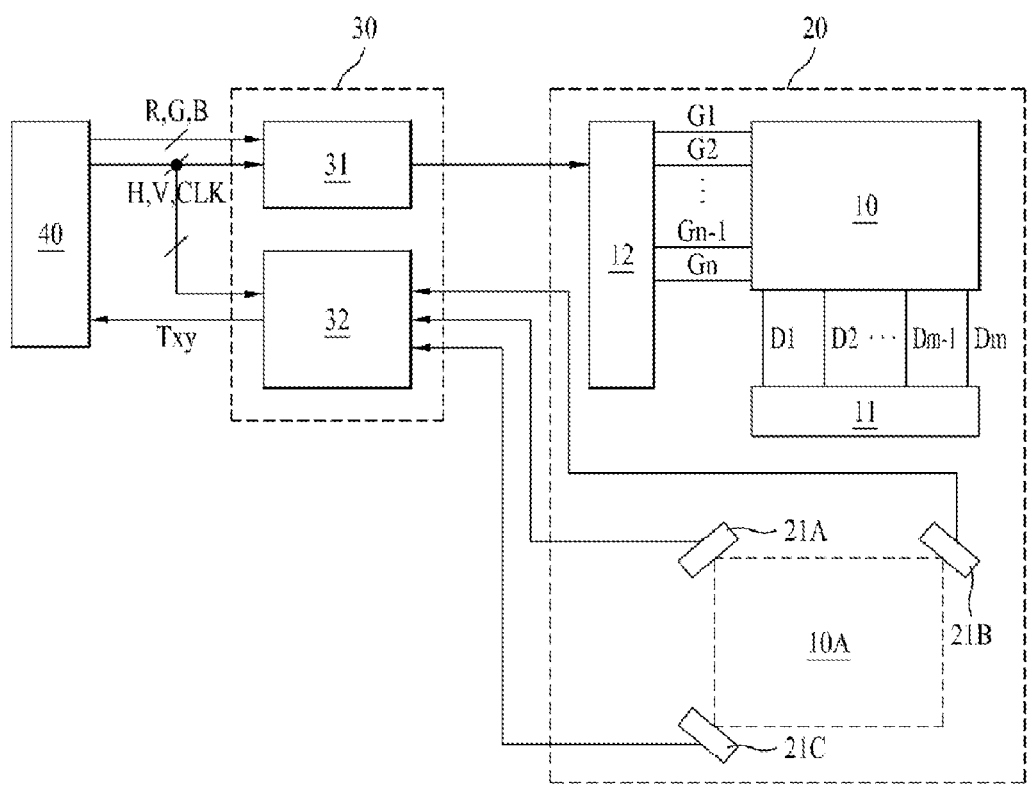
FIG. 1 illustrates a block diagram of a display device in accordance with a preferred embodiment of the present invention.
Figure 2:
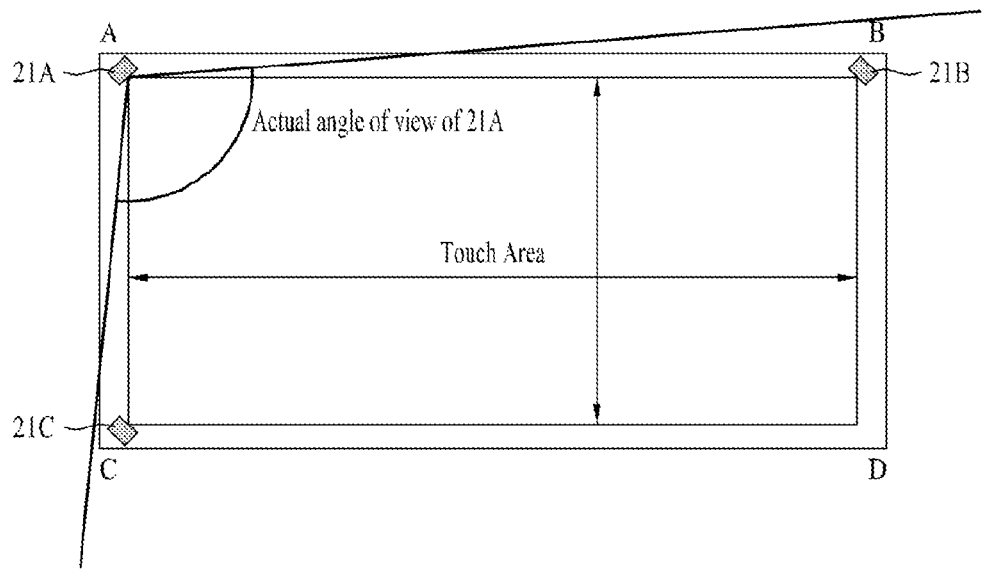
FIG. 2 illustrates a plan view of a display device in accordance with a preferred embodiment of the present invention, showing an angle of view and a touch region.
Figure 3:
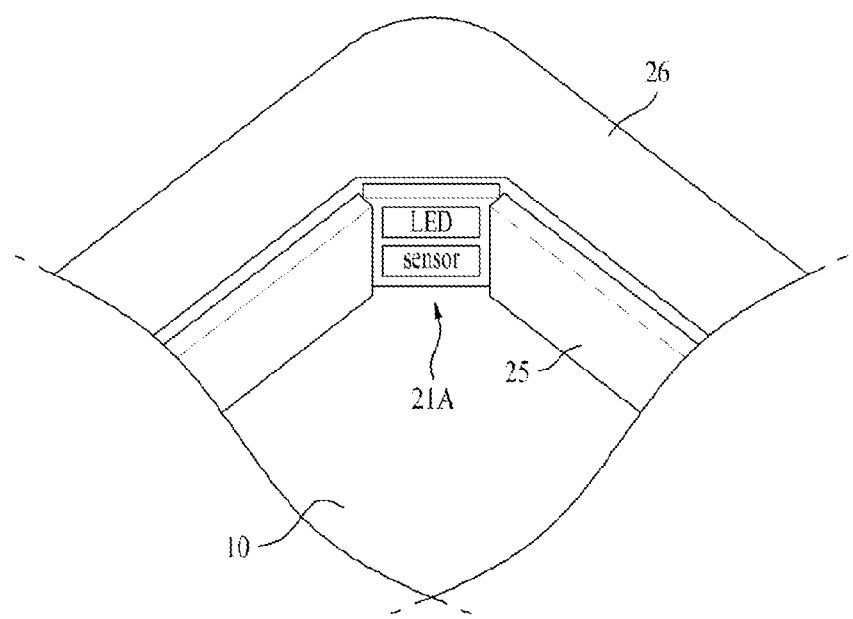
FIG. 3 illustrates a perspective view of a corner of the display device in accordance with a preferred embodiment of the present invention, showing a first infrared sensor module mounted thereto.

FIG. 1 illustrates a block diagram of a display device in accordance with a preferred embodiment of the present invention, FIG. 2 illustrates a plan view of a display device in accordance with a preferred embodiment of the present invention, showing an angle of view and a touch region, and FIG. 3 illustrates a perspective view of a corner of the display device in accordance with a preferred embodiment of the present invention, showing a first infrared sensor module mounted thereto.

Referring to FIGS. 1 to 3, the display device includes a display module 20 having infrared sensor modules 21A~21C respectively arranged at corners of a display panel which displays a picture, a control board 30 for controlling the display module 20 and performing an algorithm for perceiving a position of a touch, and a system 40 for supplying a timing signal as well as a digital video data RGB to be displayed on the display panel 10 of the display module 20 to the control board 30.

The display module 20 includes the display panel 10 for displaying the picture, a source driver 11 for supplying a data voltage to data lines D1~Dm in the display panel 10, a gate driver 12 for supplying a scan pulse to gate lines G1~Gn in the display panel 10, and the infrared sensor modules 21A~21C respectively arranged in the vicinity of corners of the display panel 10.

And, though not shown, the display module 20 includes a frame shaped case top 26 which covers edges and sides of the display panel 10 and the infrared sensor modules 21A~21C positioned at upper side corners of the display panel 10, and a casing structure of a bottom cover (Not shown) to be fastened to the case top to encase the display panel 10 from a bottom thereof.

In the meantime, though it is shown that the infrared sensor modules are arranged at the three corners, the arrangement of the infrared sensor modules is not limited to this, but may be arranged matched to two or four corners.

And, the display panel 10 may be a flat display panel, in general, rectangular one. And, the display panel 10 has two substrates and an intermediate layer formed therebetween. Depending on constituent and function of the intermediate layer, a kind of the display panel 10 varies. As an example, the display panel 10 can be a liquid crystal display panel. However, the example is not limited to this, but display panel 10 may be any one of an electrophoresis display panel, an organic luminescence display panel, a field emission display panel, and a plasma display panel.

For an example, if the display panel 10 is a liquid crystal panel, the display panel 10 includes a thin film transistor TFT substrate and a color filter substrate. There is a liquid crystal layer formed between the TFT substrate and the color filter substrate. The TFT substrate has the data lines D1~Dm and the gate lines G1~Gn formed to cross each other on a lower glass substrate. There is a matrix of liquid crystal cells Clc respectively arranged at cell regions defined by the data lines D1~Dm and the gate lines G1~Gn. The TFT formed at every crossed portion of the data lines D1~Dm and the gate lines G1~Gn transmits a data voltage to a pixel electrode at the liquid crystal cell Clc through the data lines D1~Dm in response to the scan pulse from the gate lines G1~Gn. The TFT has a gate electrode connected to the gate lines G1~Gn, a source electrode connected to the data lines D1~Dm, and a drain electrode connected to the pixel electrode at the liquid crystal cell Clc. A common voltage Vcom is supplied to a common electrode facing the pixel electrode. The color filter substrate includes a black matrix and a color filter formed on an upper glass substrate.

The common electrode is formed on the upper glass substrate in a vertical field system, such as a TN (Twisted Nematic) mode or a VA (Vertical Alignment) mode, and is formed on the lower glass substrate in a horizontal field system, such as an IPS (In Plane Switching) mode or an FFS (Fringe Field Switching) mode, together with the pixel electrode.

The source driver 11 has a plurality of data IC circuits for converting the digital video data RGB from the control board 30 to a positive polarity or a negative polarity analog gamma compensation voltage under the control of the control board 30, and supplies the analog gamma compensation voltage to the data lines D1~Dm as an analog data voltage.

The gate driver 12 has a plurality of gate IC circuits for supplying the scan pulse to the gate lines G1~Gn under the control of the control board 30 in succession.

The data IC circuits of the source driver 11 and the gate IC circuits of the gate driver 12 may be formed on the lower glass substrate by tape automated bonding TAB or chip on glass COG by using a tape carrier package TCP. The gate IC circuits of the gate driver 12 may be formed on the lower substrate at the same time with the TFTs and by the same process with a TFT process in the display panel 10, directly.

Referring to FIG. 3, each of the infrared sensor modules 21A~21C includes a light emitting unit LED and a sensor unit for receiving the light.

In this instance, the sensor unit, being a kind of image sensor, may be a line sensor or a two dimensional sensor, and includes a plurality of pixels.

And, the light emitting unit LED and the sensor unit are unified within a housing and positioned at a corner of the display panel 10, respectively. Or, depending on cases, the light emitting unit LED and the sensor unit are not unified, but mounted at the corner of the display panel 10 separated from each other. Moreover, the light emitting unit LED and the sensor unit may have a lens (Not shown) and an infrared filter respectively provided thereto additionally for making the light emitting unit LED and the sensor unit to be suitable for emitting and receiving an infrared ray.

A data on a light quantity each of the sensor units of the infrared sensor modules 21A~21C received is supplied to the control board 30, and used in calculation of the touch detection.

In the meantime, the display panel 10 has a retro-reflective plate 25 mounted in addition to the infrared sensor modules 21A~21C at the edges thereof for reflecting the light incident on the retro-reflective plate 25 from the light emitting unit to the infrared sensor modules 21A~21C. In this case, the retro-reflective plate 25 is positioned on an inside of the case top 26 for making in plane transmission of the infrared ray among the light emitting units and the sensor units of the infrared sensor modules 21A~21C. Depending on cases, there may be a frame structure (Not shown) of a plastic arranged between the retro-reflective plate 25 and the inside of the case top 26, additionally. In this case, the retro-reflective plate 25 is attached to a side of the frame structure.

In this instance, the infrared sensor modules 21A~21C mounted to the corners of the display panel 10, the retro-reflective plate 25 mounted to an edge of the display panel 10, the frame structure (Not shown) and the case top 26 having the retro-reflective plate attached thereto are called as an optical sensing frame, collectively.

The control board 30 is connected both to the source driver 11 and the gate driver 12 with flexible printed circuits FPC and connectors. The control board 30 includes a timing controller 31 and a touch control unit 32.

The timing controller 31 generates a gate control signal for controlling operation timing of the gate driver 12 and a data control signal for controlling operation timing of the source driver 11 by using vertical/horizontal synchronizing signals V, H, and a clock CLK. Moreover, the timing controller 31 supplies the digital video data from the system 40 to the source driver 11.

The touch control circuit in the touch control unit stores a reference value of each of the pixels in the sensor units of the infrared sensor modules 21A~21C, and compares an infrared signal received at the infrared sensor module to the reference value, to detect a position of the touch.

The touch control unit 32 supplies touch position coordinate information Txy to the system 40. Since the touch control unit 32 shares timing signals, such as the vertical/horizontal synchronizing signals and the clock CLK with the timing controller 31, the touch control unit 32 is operative in synchronization with the timing controller 31.

Moreover, before performing the touch position detection described above, the touch control unit 32 has an auto calibration algorithm applied thereto for auto setting of an effective angle of view of each of the infrared sensor modules 21A~21C. To do this, the touch control unit 32 further includes an auto angle setting unit (Not shown) in addition to a touch position calculating unit.

In this instance, the system 40 includes a memory having application programs built-therein, a central processing unit for putting the application program into operation, and a graphic processing circuit for superimposing an image and a touch image intended to display on the display panel 10 and processing signal interpolation and resolution conversion of the superimposed data. The system 40 receives the touch position information Txy from the touch control unit 32 and puts an application program related to the touch position information Txy into operation. For an example, if there is an icon of a particular program at coordinates of the touch position, the system 40 unloads the program from the memory and puts the program into operation. And, the system 40 superimposes the image and the touch image intended to display on the display panel 10 to generate a digital video data RGB. The system 40 may be embodied by a personal computer PC, and may transmit/receive a data to/from the touch control unit 32 through a serial or universal serial bus USB interface.

In the meantime, referring to FIG. 2, an actual angle of view of each of the infrared sensor modules 21A~21C is about 95~100°, which is greater than 90°. The angle of view of each of the infrared sensor modules is made greater than 90° thus for preventing a region on an active region of the display panel 10 from taking place as much as a deviated angle, at which detection of the touch thereto fails even if there is a small amount of deviation of the case top 26, the retro-reflective plate 25 or the infrared sensor modules 21A~21C if the angle of view is 90°, precisely. Therefore, it is required that the angle of view of each of the infrared sensor modules 21A~21C has an adequately great range taking possible deviation into account.

In the meantime, since the retro-reflective plates are positioned at 90° from each other on two sides adjacent to the infrared sensor modules 21A~21C, to shade a region except a 0°~90° region with the retro-reflective plate 25 and the case top leaving an actual touch detection region to be between the 0°~90° region even if the angle of view of each of the infrared sensor modules 21A~21C is greater than 90°. Each of the infrared sensor modules 21A~21C has the sensor unit for receiving a light, and the sensor unit has a plurality of pixels enabling the sensor unit to receive the light at each of the pixels according to an angle of each of the pixels.

In this case, it is important to find a pixel in the sensor unit in each of the infrared sensor modules 21A~21C, which matches to the effective angle. Since angles are not effective as the touch region except the 0°~90° which enables an actual touch detection, a pixel matched to the 0° and a pixel matched to the 90° are set in the sensor unit in the infrared sensor, and pixels prior to the pixel matched to the 0° and pixels after the pixel matched to the 90° are excluded at the time of touch position detection since values from the pixels are inaccurate even if the pixels have any light signals.

In the meantime, the display module 20 of the present invention has the infrared sensor modules 21A~21C mounted to at least two corners of the display panel 10, and each of the infrared sensor modules 21A~21C senses a light from the infrared sensor modules 21A~21C positioned at other corners. In this instance, the light from the infrared sensor modules 21A~21C at other corner is a light emitted from the light emitting unit directly which has light intensity higher than the light from the retro-reflective plate, and consequently brighter than the light from the retro-reflective plate, and has an impulsive characteristic (Observed as a peak value) since the light is concentrated at the corner. In this instance, the light from another infrared sensor module opposite to the infrared sensor module sensing light is called as a direct light, and the light from the retro-reflective plate is called as a reflected light.

If such an impulse is measured at the time the light received at the sensor unit in the infrared sensor module is observed pixel by pixel, since this means an infrared sensor module positioned at other corner, the pixel showing the impulse may be mapped with an absolute angle matched to the corner to use as a reference point.

If the pixel showing the impulse is used as the reference point thus, by auto setting a reference every time the display device is driven, the touch measurement error taking place due to deviation at the time of mounting of the infrared sensor modules 21A~21C to the display panel 10, or due to a relative motion of the infrared sensor modules 21A~21C caused by tolerance may be prevented.

And, by utilizing a sharp change of a slope of the light quantity sensed at the 0° and the 90° for the corner having no infrared sensor module mounted thereto, a start point and an end point can be located by detection of the slope.

That is, in the present invention, the start point and the end point of a touch area are set matched to the 0° and the 90° each of the infrared sensor modules 21A~21C senses, or set by detecting the slope. Therefore, by performing auto angle setting (Auto calibration algorithm) at every turn on of the display device automatically, the touch area may be defined without physical correction. That is, in general, since the display panel in the display device is rectangular, a region of an effective angle of view (Region of Interest) is defined as a region between the 0° which is a side adjacent to any one of the infrared sensor modules 21A~21C, and the 90° which is another side adjacent to the any one of the infrared sensor modules 21A~21C.

Figure 4:
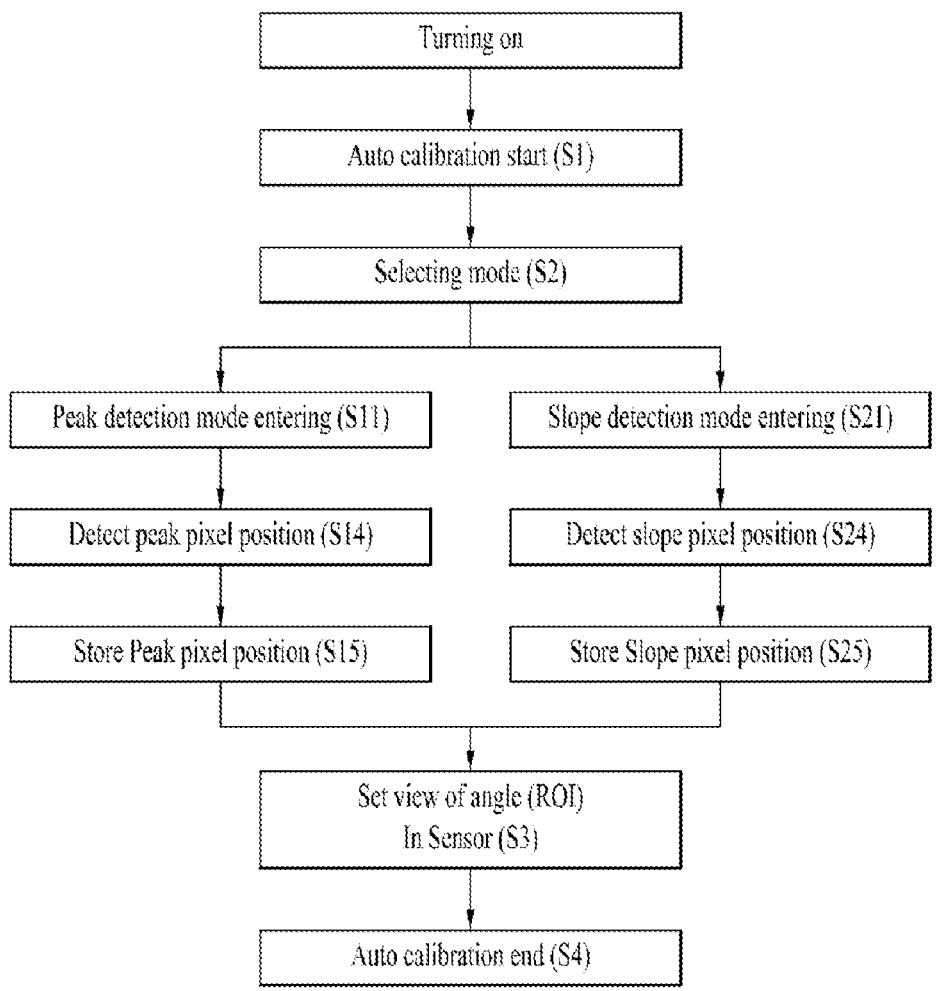
FIG. 4 illustrates a flow chart showing the steps of a method for auto angle setting of a first infrared sensor module in accordance with a preferred embodiment of the present invention.

FIG. 4 illustrates a flow chart showing the steps of a method for auto angle setting of a first infrared sensor module in accordance with a preferred embodiment of the present invention.

Referring to FIG. 4, the present invention relates to a method for auto angle setting of an infrared sensor module having a light emitting unit and a sensor unit arranged at least two corners of a display panel, having the following steps.

At first, after turning on a display device, start auto calibration (S1).

Then, select any one of a peak detection mode and a slope detection mode at the touch control unit (S2).

If the peak detection mode is entered (S12), locate a pixel at the sensor unit of the infrared sensor module which senses a light quantity matched to a corner having other infrared sensor module arranged thereto (S14), set the pixel as a reference point, and store the same (S15).

On the other hand, if the slope detection mode is entered (S21), the light quantity of a start pixel block and an end pixel block of the sensor unit of each of the infrared sensor modules are analyzed, to locate a pixel which forms a greatest slope (S24), to set and store the pixel located thus as the start point or the end point (S25).

Then, with reference to the reference point, the start point and the end point, the region of interest is set (D3) in the sensor unit of each of the infrared sensor modules. The reference point may overlap with the start point or the end point. This is because, in a position of the infrared sensor module which senses, other infrared sensor modules may position at the 0° and the 90°, respectively.

Then, the auto calibration ends (S4).

Thereafter, a general touch position detection mode is performed.

In the method for auto setting of an angle of an infrared sensor module described above, either of the peak detection mode or the slope detection mode may be performed at first. Depending on cases, in a case the infrared sensor modules are mounted to four corners, only the peak detection mode may be performed. And, it is possible that the slope detection mode may be performed without performing the peak detection mode to set only the start point and the end point at the sensor unit of each of the infrared sensor modules for setting the angle, automatically.

In the case of the peak detection, since the light is concentrated intensively in view of a nature of the direct light, the pixel matched to the direct light is observed as a point, enabling more precise designation of the pixel than a case of the slope detection in which observation of the slope is required from a block of a plurality of pixels, it may be preferable that the peak detection is performed at first and, in succession to this, the slope detection is performed.

A light quantity sensing and a detailed auto angle setting method in the peak detection mode and the slope detection mode will be described.

Figure 5:
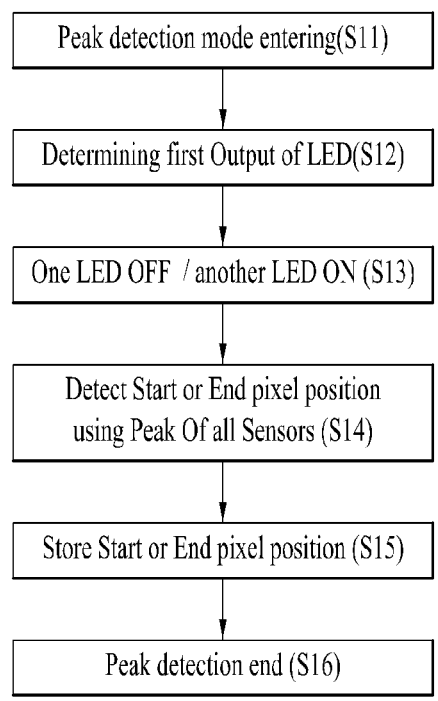
FIG. 5 illustrates a flow chart showing the steps of the peak detection mode in FIG. 4.

FIG. 5 illustrates a flow chart showing the steps of the peak detection mode in FIG. 4.

The peak detection mode will be described in detail.

Upon entering into the peak detection mode (S11), after determining a first output of the light emitting unit of the infrared sensor module (S12), the light emitting unit is turned on (S13). Then, the light quantity is sensed at the sensor unit of the infrared sensor module, and the light quantity sensed thus is analyzed, to locate a pixel which shows an impulse shaped peak (S14). In this instance, the impulse shaped peak at the pixel is caused by the direct light sensed at the pixel, and the direct light is caused by the concentrated light emission from corners at which the infrared sensor modules other than the infrared sensor module that senses the direct light are positioned, respectively. The pixel which sensed the direct light is set as a reference point, and a position of the pixel is stored at the sensor unit of the infrared sensor module (S15).

In this instance, the first output is set lower than an output at the time of general touch position detection. This is because, at the time of the general touch position detection, a reflected light output capability of the retro-reflective plate is set higher than a touch detection threshold value of the light quantity. That is, at the time of the general touch position detection, it is designed that the light quantity produced from each region is almost close to a saturation value in a state no touch is made such that a difference of sensed light quantities between the reflected light and the direct lights from other infrared sensor modules is set to be small. In the peak detection mode of the present invention, since it is necessary to separate the direct light from the reflected light, the output of the light emitting unit is set low so that the reflected light is not saturated.

As shown, in the step of turning on the light emitting unit of the infrared sensor module, the light emitting units of other infrared sensor modules except the infrared sensor module that senses the light quantity may be turned on. This is because, in the peak detection, the light emitted from the light emitting unit of the infrared sensor module that senses the light quantity is not used for the light quantity sensing. In this instance, the light emitting units of the infrared sensor modules may be turned on at time points different from one another. In this case, as shown in FIG. 2, when the sensing is made at the first infrared sensor module 21A, the light emitting unit of the first infrared sensor module is turned off, the light emitting units of the second infrared sensor module 21B and the third infrared sensor module 21C may be turned on in succession, or simultaneously, for performing the sensing.

However, a mode of sensing is not limited to this invariably, but same time light emission and same time sensing may be designed.

In this instance, the first output is a value lower than the touch position detection, which can be made by turning on the light emitting unit shorter than the touch position detection, or making a light emission quantity of the light emitting unit smaller than the touch position detection.

Then, the peak detection mode ends (S16).

Figure 6:
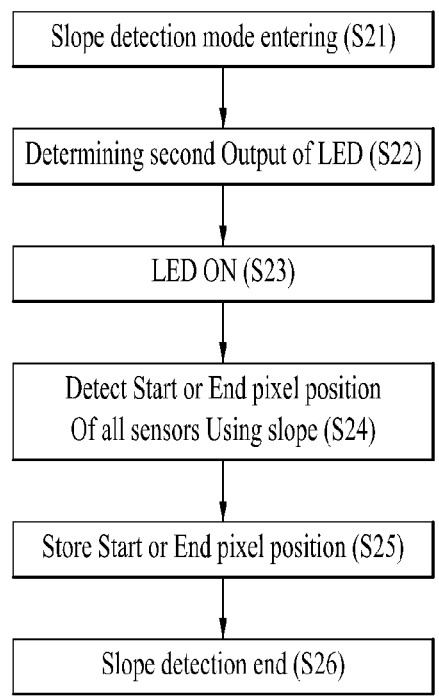
FIG. 6 illustrates a flow chart showing the steps of the slope detection mode in FIG. 4.

FIG. 6 illustrates a flow chart showing the steps of the slope detection mode in FIG. 4.

Upon entering into the slope detection mode (S21), after setting outputs of the light emitting units of the infrared sensor modules to a second output (>the first output) (S22) and turning on (S23), the light quantity is sensed at each of the light emitting units (S24). In this instance, the second output is set the same with an output at the time of the general touch position detection.

And, the pixel of which slope is observed to be a steepest is set and store as the start point if the pixel is at a start pixel block of the sensor unit of each of the infrared sensor modules, and the pixel of which slope is observed to be the steepest is set and store as the end point if the pixel is at an end pixel block of the sensor unit of each of the infrared sensor modules (S25).

The start pixel block and the end pixel block of the infrared sensor module may be set to be 20~100 pixels at opposite ends of pixels of the sensor unit. These values may be increased/decreased depending on a number of pixels of the sensor unit.

Alike the peak detection mode, a step of turning on the light emitting unit of the infrared sensor module in the second output may be made by turning on the light emitting units of the infrared sensor modules except the infrared sensor module that sense the light quantity. In this instance, the light emitting units of the infrared sensor modules may be turned on at the time points different from each other. Of course, in the step of turning on the light emitting unit of the infrared sensor module in the second output, the light emitting units of the infrared sensor modules may be turned on simultaneously.

Then, the slope detection mode ends (S26).

In the meantime, the start point is 0° in a position of the infrared sensor module which senses, and the end point is 90° in a position of the infrared sensor module which senses.

Figure 7:
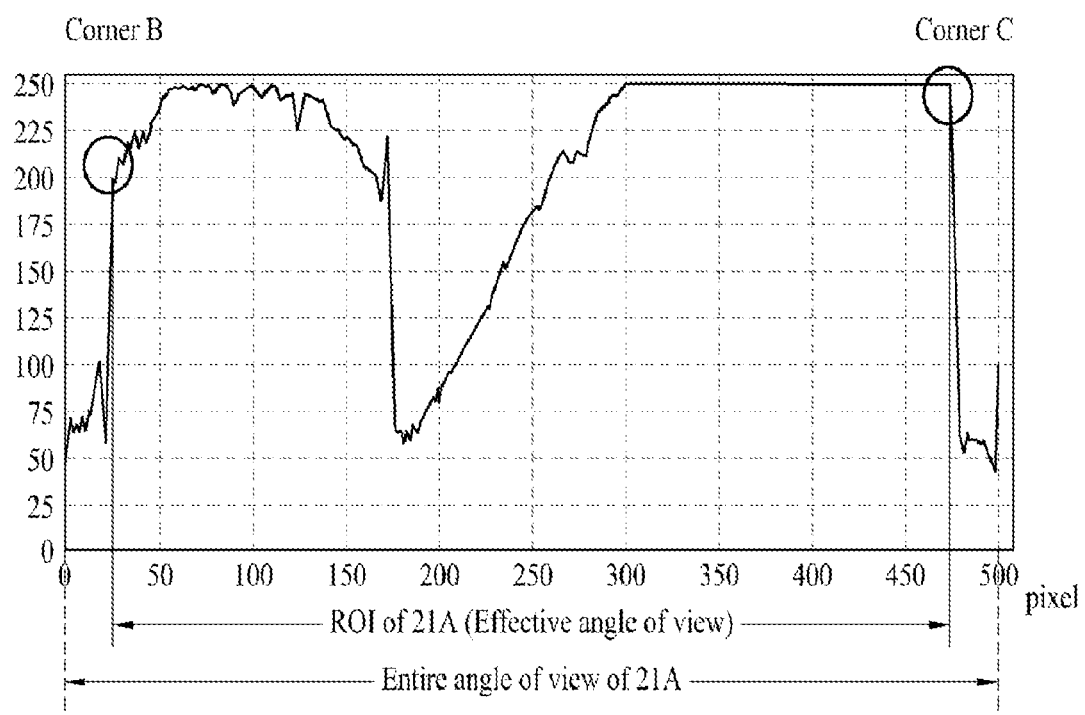
FIG. 7 illustrates a graph showing light sensing data on each of pixels in the first infrared sensor module in FIG. 2.
Figure 8:
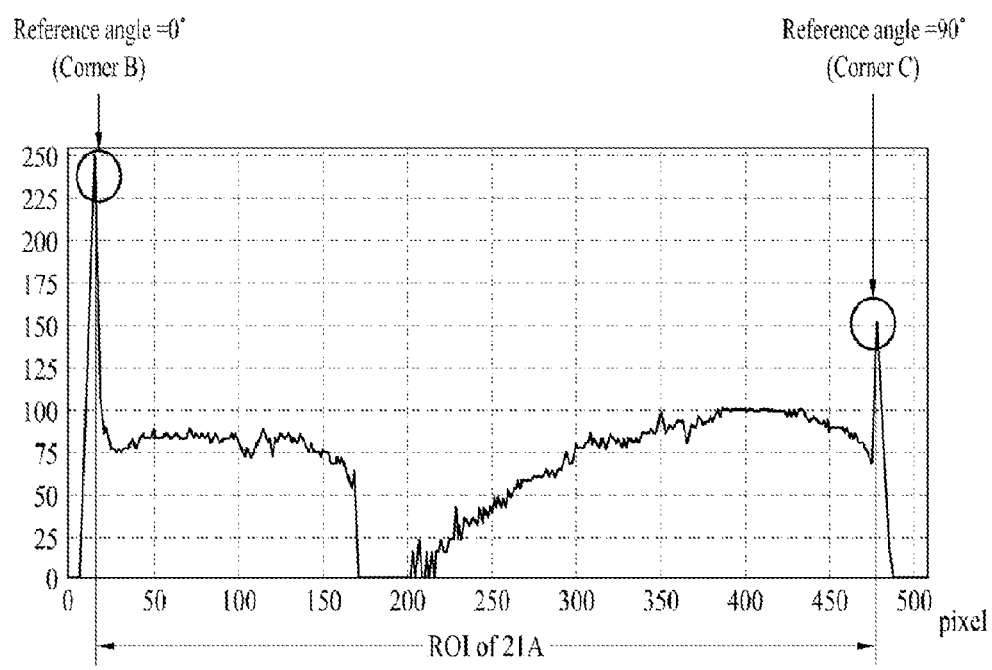
FIG. 8 illustrates a graph showing light sensing data on each of pixels in the first infrared sensor module in FIG. 2 when an output of a light emitting unit is lowered.

FIG. 7 illustrates a graph showing a light sensing data on each of pixels in the first infrared sensor module in FIG. 2, and FIG. 8 illustrates a graph showing a light sensing data on each of pixels in the first infrared sensor module in FIG. 2 when an output of a light emitting unit is lowered.

For an example, a test is carried out with a kind of line sensor having 500 pixels as the sensor unit of each of the infrared sensor modules 21A~21C. A number of the pixels may be increased/decreased, and changed to a two dimensional sensor.

Referring to FIGS. 7 and 8, in view of the first infrared sensor module 21A, the first to 500th pixels correspond to an entire angle of view, the region of interest corresponding to the 0° and the 90° is within the 500 pixels.

In the meantime, referring to FIG. 6, like the general touch position detection mode, if the light emitting unit of the infrared sensor module maintains a highest output, in order to separate the direct light from the reflected light, the output of the light emitting unit is lowered. For an example, if the output of the light emitting unit is set to be 200 W level in the touch detection mode, the output in the auto angle setting mode of the infrared sensor module is lowered to ¼ thereof to about 50 W to make the light quantity sensed at each of the pixels in the sensor unit of the infrared sensor module to move down on the whole as shown in FIG. 8. However, since the pixels matched to corners B and C where the second, and third infrared sensor modules position sense the direct lights directly relative to the pixels matched to the retro-reflective plate, to observe the momentary peak value with the impulse characteristic at the pixels, the pixels at which the peak values are observed are determined to be matched to the corners B and C. In this case, the corner B corresponds to the effective angle 0°, and the corner C corresponds to the effective angle of 90°.

That is, a light reception data shown in FIG. 8 is obtained from the light emitting unit of which light quantity is set smaller than the touch position detection mode for auto angle setting at an initial stage drive of the display device.

In this case, the first infrared sensor module determines relative positions of the second and third infrared sensor modules with reference to the direct lights from light sources at the second and third infrared sensor modules, and regions falling under the positions are set as the corners. Therefore, even if some or all of the infrared sensor modules are deviated, a relative position can be set at its own sensor unit as an angle on another infrared sensor module, automatically. In this case, the effective horizontal angle of view of the first infrared sensor module is automatically corrected accurately, to improve an accuracy of the touch. Then, according to a relation of angles among the infrared sensor modules, the touch position detection is possible within the effective angle of view.

The peak detection of the second infrared sensor module 21B and the third infrared sensor module 21C will be described.

Figure 9:
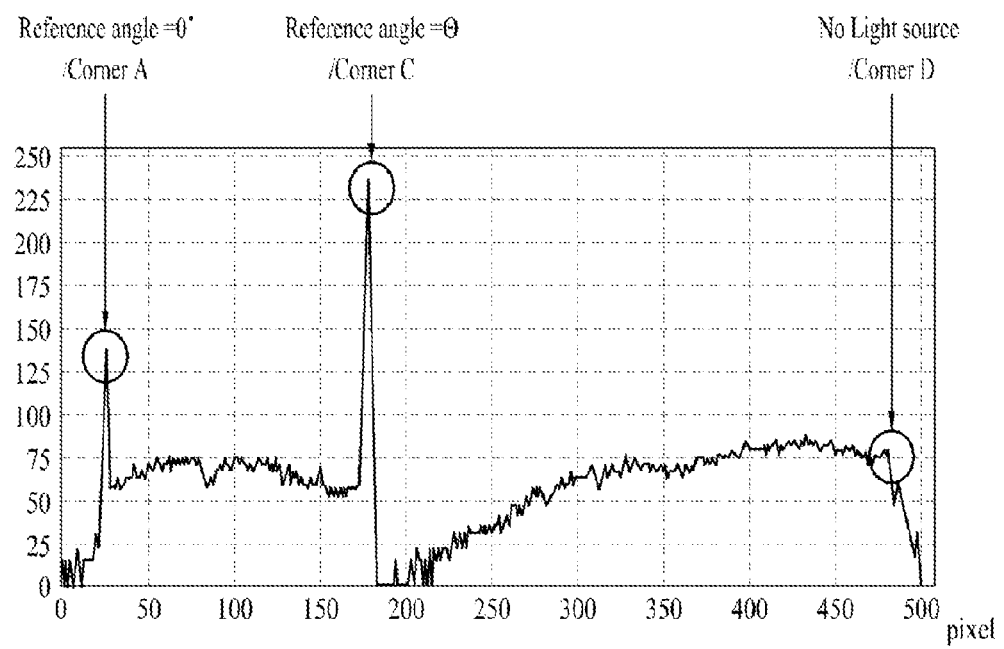
FIG. 9 illustrates a graph showing light sensing data on each of pixels in the second infrared sensor module in FIG. 2 for detection of a peak.

FIG. 9 illustrates a graph showing a light sensing data on each of pixels in the second infrared sensor module in FIG. 2 for detection of a peak.

Referring to FIG. 9, the light sensing data is on an output of the light emitting unit lowered down to the first output for peak detection, showing an impulse characteristic of pixels matched to the infrared sensor module which emits the direct light.

Referring to FIG. 9, in a position of the second infrared sensor module 21B, since the first infrared sensor module 21A is arranged at the corner A which corresponds to the angle 0°, the impulse of the direct light is observed, and since the corner D which corresponds to the angle 90° has no infrared sensor module, no impulse is observed. In this instance, in a position of the second infrared sensor module 21B, the corner C where the third infrared sensor module positions forms an angle of θ which is equivalent to $\tan^{-1}(b/a)$ if the display panel 10 has a width a and a height b. That is, the angle of θ may vary with a ratio of the height to the width of the display panel 10. In this case, a portion opposite to the corner C may also be used as a reference on the θ as the third infrared sensor module is arranged thereto. For an example, in a case of the display panel having a ratio of 16:9, the θ corresponds to about 30°.

Figure 10:
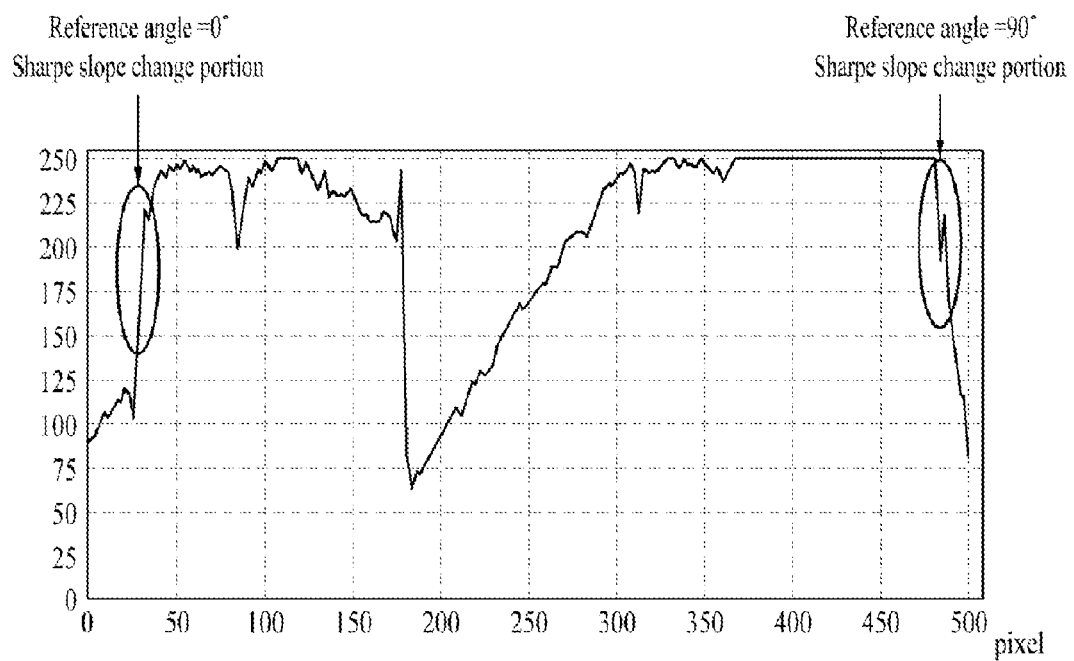
FIG. 10 illustrates a graph showing light sensing data on each of pixels in the second infrared sensor module in FIG. 2 for detection of a slope.

FIG. 10 illustrates a graph showing a light sensing data on each of pixels in the second infrared sensor module in FIG. 2 for detection of a slope.

Referring to FIG. 10, in order to detect the slope, the output of the light emitting unit is elevated to a level at which the general touch position detection is made, to sense the light quantity of each pixel of the second infrared sensor module.

In this instance, in a position of the second infrared sensor module 21B, since the light is shielded by the retro-reflective plate before the effective angle 0° and after the effective angle 90° at the corner A and the corner D which correspond to the 0° and the 90° respectively, the sensed light quantity becomes small. Therefore, the slope of the light quantity is steep before and after the 0° and the 90° at the pixels corresponding to the 0° and the 90°.

In this case, like the corner D, even if no direct light exists since no light emitting unit exists as no infrared sensor module is provided thereto, a pixel corresponding to the 90° can be located with reference to a change of the slope.

In this instance, since the direct light as well as the sharpe change of the slope is observed at the corner A, even if any one of the direct light detection or the slope detection is used, since the corner A corresponds to the angle 0°, the same pixel may be located.

Thus, by applying any one of the peak detection or the slope detection, effective angles corresponding to the 0° and the 90° may be set.

According to this, faulty touch position detection liable to take place by deformation or deviation of the product may be resolved. Along with this, since the automatic angle setting method is performed every time the product is turned on, dispensing with the requirements for additional correction at a fabrication shop or by a general worker, enabling to dispense with the requirement of additional line set up, a process time can be reduced significantly. And, since the general worker is not required to do the correction work, the cumbersome manual correction can be eliminated, and correction mistake can be cut off, which is caused by faulty touch that is liable to take place in manual correction.

A reason will be described with reference to an incident angle on the retro-reflective plate, in which differences of the light quantities take place among the pixels even in a state no touch is made.

Figure 11:
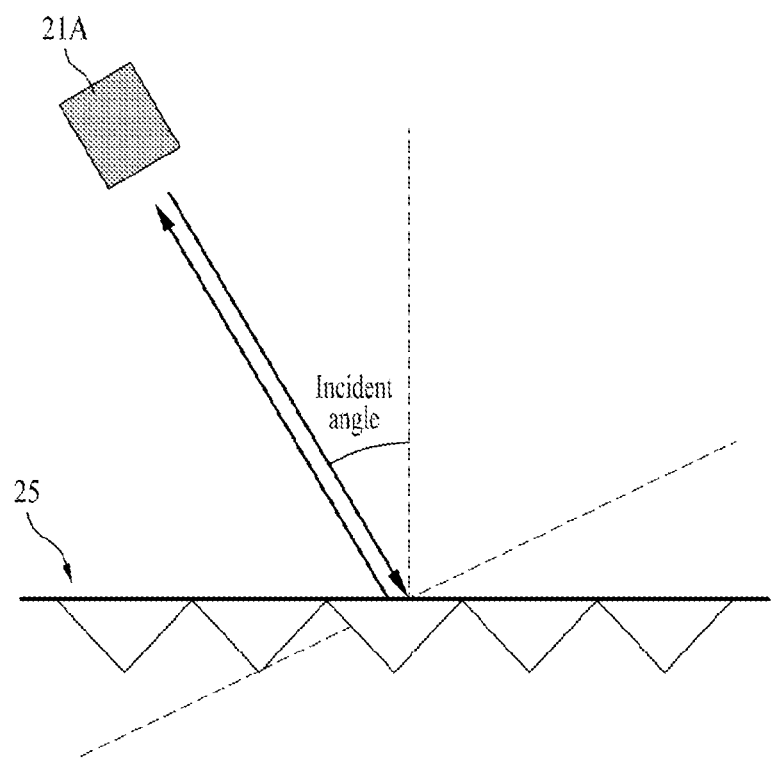
FIG. 11 illustrates a schematic view of reflection of a light at a retro-reflective plate on an incident angle.
Figure 12:
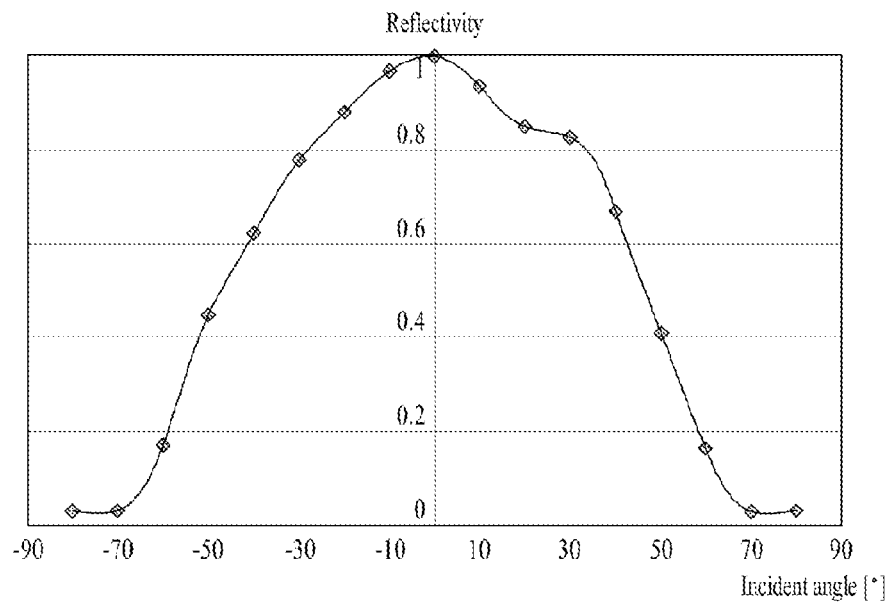
FIG. 12 illustrates a graph showing variation of reflectivity of a light at a retro-reflective plate on an incident angle.

FIG. 11 illustrates a schematic view of reflection of a light at a retro-reflective plate on an incident angle, and FIG. 12 illustrates a graph showing variation of reflectivity of a light at a retro-reflective plate on an incident angle.

Referring to FIG. 11, a light incident on the retro-reflective plate from the infrared sensor module is reflected back at the same angle, again. In this instance, as shown in FIG. 12, with regard to reflectivity for an incident angle of the light on the retro-reflective plate, if the light is incident thereon at an angle of 0°, the reflectivity becomes a greatest value, and if the light is incident thereon at an angle of 90°, the reflectivity becomes almost 0.

The retro-reflective plate includes a retro-reflector layer, a first adhesive layer and a second adhesive layer formed on an upper side and an underside of the retro-reflector layer, and an optical filter on the second adhesive layer. In this instance, the retro-reflector layer is a kind of cubical body of a cube-corner structure showing good efficiency light sensation at an incident angle ranging from 0° to 65° to have a kind of shape in which micro prism is arranged continuously. In this case, an apex of the prism of the retro-reflector layer is arranged to direct an inside of the case top of a flat display panel.

Figure 13A:
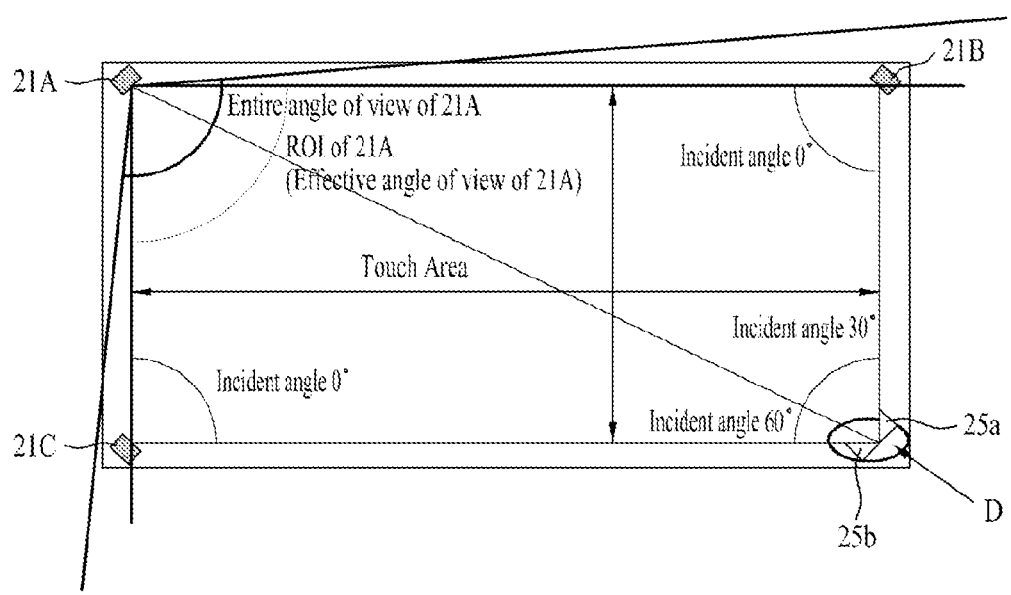
FIG. 13A illustrates a plan view showing variation of an incident angle of a display panel having a ratio of 16:9.
Figure 13B:
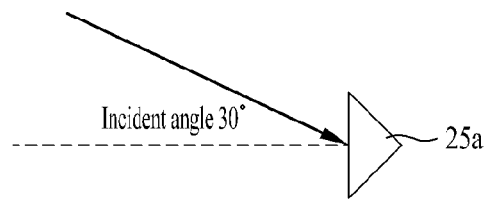
FIGS. 13B and 13C illustrate schematic views showing variation of an incident angle at a region adjacent to a corner in an infrared sensor module member of a display panel having a ratio of 16:9.
Figure 13C:
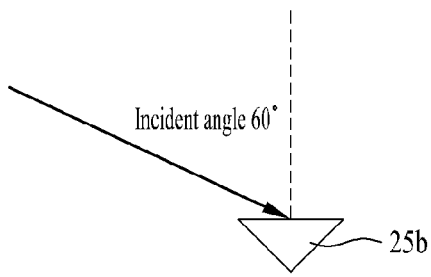

FIG. 13A illustrates a plan view showing variation of an incident angle of a display panel having a ratio of 16:9, and FIGS. 13B and 13C illustrate schematic views showing a variation of an incident angle at a region adjacent to a corner in an infrared sensor module member of a display panel having a ratio of 16:9.

Particularly, the variation of the incident angle is great at the corner where the retro-reflective plate is bent in directions different from each other. For an example, as shown in FIG. 13A, since a micro prism 25a in a height direction retro-reflective plate and a micro prism 25b in a width direction retro-reflective plate have directions different from each other even if the micro prisms 25a and 25b are arranged at the same corner, when the first infrared sensor module looks at a diagonal direction, the incident angle of the micro prism 25a in the height direction retro-reflective plate is 30° as shown in FIG. 13B while the incident angle of the micro prism 25b in the width direction retro-reflective plate is 60° as shown in FIG. 13C.

Figure 14:
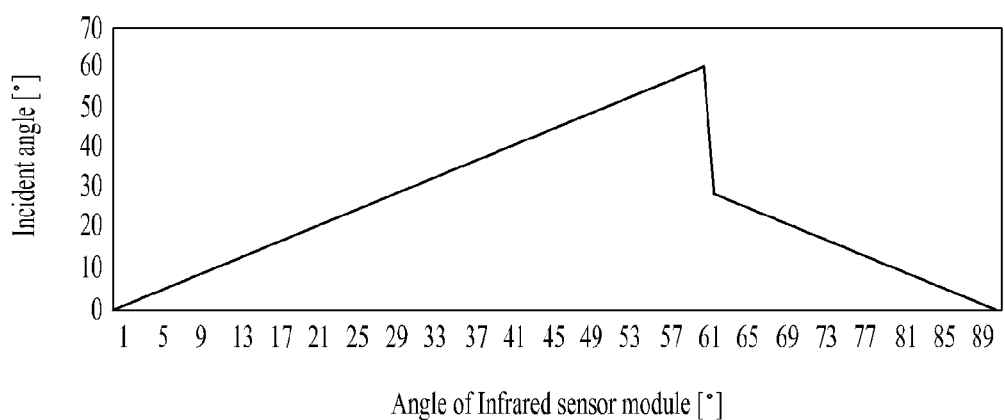
FIG. 14 illustrates a graph showing an incident angle on a retro-reflective plate versus a measuring angle of an infrared sensor module in a display panel having a ratio of 16:9.
Figure 15:
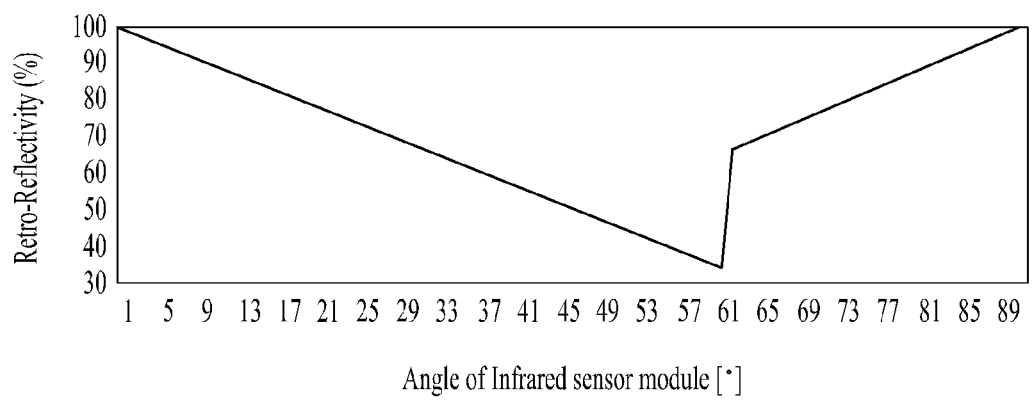
FIG. 15 illustrates a graph showing a retro-reflectivity of a retro-reflective plate versus a measuring angle of an infrared sensor module opposite to the infrared sensor module in FIG. 14.

FIG. 14 illustrates a graph showing an incident angle on a retro-reflective plate versus a measuring angle of an infrared sensor module in a display panel having a ratio of 16:9, and FIG. 15 illustrates a graph showing a retro-reflectivity of a retro-reflective plate versus a measuring angle of an infrared sensor module opposite to the infrared sensor module in FIG. 14.

In the meantime, since the retro-reflective plates are arranged to four sides of the display panel, one infrared sensor module has incident angles thereon different with positions of the retro-reflective plates to have different incident angles of the retro-reflected lights on the sensor unit thereof. Therefore, it is required to take both the angle the infrared sensor module faces the retro-reflective plate, and a retro-reflectivity characteristic of the retro-reflective plate on the incident angle into account for determining the reflectivity of each angle the infrared sensor module faces the retro-reflective plate.

FIG. 14 illustrates a graph showing an incident angle on each of the angle the infrared sensor module faces the retro-reflective plate at the time the first infrared sensor module 21A senses a light quantity, setting a case the first infrared sensor module 21A looks at the corner B in a horizontal direction as 0° and a case the first infrared sensor module 21A looks at the corner C in a vertical direction as 90°, and FIG. 15 illustrates a graph showing the retro-reflectivity opposite to above. In this instance, the incident angle on each of the angle the infrared sensor module looks at the retro-reflective plate and the retro-reflectivity show close to an inverted shape under a principle that the greater the incident angle of the retro-reflectivity, the lower the reflectivity described with reference to FIG. 12.

A display device of which corner shape is changed for avoiding sudden change of the reflectivity due to difference of directions of the micro prism in the retro-reflective layer of the retro-reflective plate at the corner having no infrared sensor module provided thereto will be described.

Figure 16:
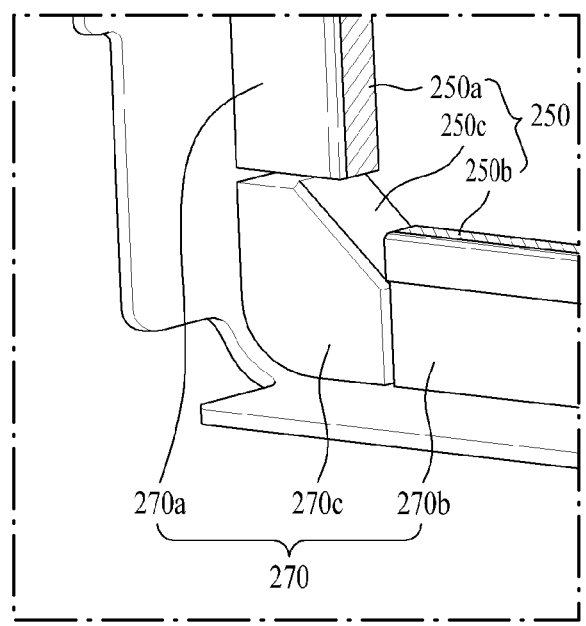
FIG. 16 illustrates a plan view showing a corner diagonal treatment at a side having no infrared sensor module mounted thereto in a display device in accordance with a preferred embodiment of the present invention.

FIG. 16 illustrates a plan view showing a corner diagonal treatment at a side having no infrared sensor module provided thereto in a display device in accordance with a preferred embodiment of the present invention.

Referring to FIG. 16, in order to arrange the retro-reflective plate in a diagonal direction at the corner no infrared sensor module provided thereto, a frame structure 270c which faces the display panel 10 is diagonal treated. Then, a retro-reflective plate 250c which faces the diagonal direction is attached to a side of the frame structure 270c. In this case, the width direction and the height direction frame structures 270a and 270b, and the retro-reflective plates 250a and 250b respectively attached thereto are provided to the sides adjacent to the corner, respectively. Other elements are identical to the description made with reference to FIGS. 1~3. In this case, the reflected light at the corner may be increased to set the corner as a new reference point.

In this instance, the diagonal treated frame structure 270c and the frame structures 270a and 270b on the other sides are called as a frame structure 270, collectively. Alikely, the retro-reflective plate 250c attached in the diagonal direction and the retro-reflective plates 250a and 250b on the other sides are called as the retro-reflective plate 250, collectively.

As has been described, the method for auto angle setting of an infrared sensor module, and the display device having the same applied thereto have the following advantages.

First, each of the infrared sensing modules having the sensor unit separates the direct light incident thereto from other infrared sensing modules from the reflected light incident thereon from the retro-reflective plate by means of intensity thereof to set the reference point in its own sensor unit in the infrared sensing module. According to this, by performing auto calibration, the infrared sensing module makes automatic position perception of another infrared sensing module regardless of deviation of the infrared sensing module, enabling to make accurate touch detection. The auto calibration enables setting of a reference without physical correction not only in a case of assembly, but also in a case of transportation or deviation taken place in a finished product.

Second, when the corner having no infrared sensing module mounted thereto corresponds to the 0° or the 90°, by determining the slope with reference to variation of the light quantities of pixels, to match a pixel of the sensor unit having steeper slope to the 0° or the 90°, the pixel of the sensor unit corresponding to the corner having no infrared sensing module mounted thereto may be located. Especially, this is useful in a case the display panel is provided with no more than three infrared sensing modules. After locating the pixels corresponding to the 0° and the 90°, angular values between 0°-90° are given to the pixels between the pixel corresponding to the 0° and the pixel corresponding to the 90°. According to this, ineffective pixels can be excluded, enabling to prevent faulty touch detection.

Third, by setting a position of another infrared sensing module, the infrared sensing module can correct touch coordinates according to an extent of deviation. Even though the related art infrared sensing module cannot correct deviation with reference to a preset look-up table if the deviation takes place after assembly, since the auto calibration method of the present invention has position information on another infrared sensing module set at the infrared sensing module itself, the touch coordinate correction on deviation taken place during transportation or use after the assembly is possible.

Fourth, by omission of correction of the deviation in mass production, times required for production and assembly can be saved. And, influence come from deviation of worker's error can be eliminated.

Fifth, since an algorithm for correction with reference to the look-up table can be omitted, a cost required for providing the algorithm can be saved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for auto angle setting of an infrared sensor module having a light emitting unit and a sensor unit arranged at least two corners of a display panel, comprising the steps of:
   selecting a peak detection mode or a slope detection mode;
   in the peak detection mode, setting a pixel of in the sensor unit of an infrared sensor module which senses a light quantity as a reference point corresponding to a corner other infrared sensor module is arranged at;
   in the slope detection mode, analyzing the light quantities of a start pixel block and an end pixel block in the sensor unit of each of the infrared sensor modules, and setting a pixel which forms a greatest slope as a start point or an end point; and
   setting an effective angle of view in the sensor unit of each of the infrared sensor modules with reference to the reference point, the start point, and the end point.

2. The method as claimed in claim 1, wherein the peak detection mode includes the steps of;
   turning on the light emitting unit in the infrared sensor module as a first output,
   sensing the light quantity at the sensor unit in the infrared sensor module, and
   analyzing the light quantity sensed thus to set the pixel which generates a direct light as the reference point.

3. The method as claimed in claim 2, wherein the step of turning on the light emitting unit in the infrared sensor module as the first output includes the step of turning on the light emitting units of other infrared sensor modules except the infrared sensor module which senses the light quantity.

4. The method as claimed in claim 2, wherein the step of turning on the light emitting unit in the infrared sensor module as the first output includes the step of turning on the light emitting units of the infrared sensor modules at time points different from each other.

5. The method as claimed in claim 2, wherein the step of turning on the light emitting unit in the infrared sensor module as the first output includes the step of turning on the light emitting units of the infrared sensor modules simultaneously.

6. The method as claimed in claim 2, wherein the step of turning on the light emitting unit in the infrared sensor module as the first output includes the step of making a turning on time period of the light emitting unit of the infrared sensor module to be shorter than a time period at the time of touch position detection.

7. The method as claimed in claim 2, wherein the step of turning on the light emitting unit in the infrared sensor module as the first output includes the step of making a light emission quantity from the light emitting unit of the infrared sensor module smaller than a light emission quantity at the time of touch position detection.

8. The method as claimed in claim 2, wherein the pixel which generates a direct light is a pixel showing an impulsive light quantity characteristic.

9. The method as claimed in claim 2, wherein the infrared sensor module of which light emitting unit is turned on is different from the infrared sensor module which senses the light quantity.

10. The method as claimed in claim 2, wherein the slope detection mode includes the steps of;
    turning on the light emitting unit in each of the infrared sensor modules as a second output (>the first output),
    sensing the light quantity at the sensor unit in each of the infrared sensor modules,
    analyzing the light quantity sensed thus to locate a pixel which forms a greatest slope at a start pixel block and an end pixel block of the sensor unit in each of the infrared sensor modules, and
    setting and storing each of the pixels which forms the greatest slope as the start point or the end point.

11. The method as claimed in claim 10, wherein the start pixel block in each of the sensor units is initial 20~100 pixels of an entire pixels of each of the sensor units, and
    the end pixel block in each of the sensor units is last 20~100 pixels of an entire pixels each of the sensor units.

12. The method as claimed in claim 10, wherein the step of turning on the light emitting unit in each of the infrared sensor modules as the second output includes the step of turning on the light emitting unit in other infrared sensor modules except the infrared sensor module which senses the light quantity.

13. The method as claimed in claim 10, wherein the step of turning on the light emitting unit in each of the infrared sensor modules as the second output includes the step of turning on the light emitting unit in each of the infrared sensor modules at time points different from each other.

14. The method as claimed in claim 10, wherein the step of turning on the light emitting unit in each of the infrared sensor modules as the second output includes the step of turning on the light emitting unit in each of the infrared sensor modules simultaneously.

15. The method as claimed in claim 10, wherein the step of turning on the light emitting unit in each of the infrared sensor modules as the second output includes the step of making a light emission quantity from the light emitting unit in each of the infrared sensor modules the same as the light emission quantity at the time of touch position detection.

16. A method for auto angle setting of an infrared sensor module having a light emitting unit and a sensor unit arranged at least two corners of a display panel, comprising the steps of:

turning on the light emitting unit in each of the infrared sensor modules as a first output;

sensing a light quantity at the sensor unit in each of the infrared sensor modules;

analyzing the light quantity sensed thus to set a pixel which generates a direct light at the sensor unit in each of the infrared sensor modules as the reference point;

turning on the light emitting unit in each of the infrared sensor modules as a second output higher than the first output;

sensing the light quantity at the sensor unit in each of the infrared sensor modules;

analyzing the light quantity sensed thus to locate a pixel which forms a greatest slope at a start pixel block and an end pixel block of the sensor unit in each of the infrared sensor modules;

setting and storing each of the pixels which forms the greatest slope as a start point or an end point; and setting an effective angle of view in the sensor unit in each of the infrared sensor modules with reference to the reference point, the start point, or the end point.

17. A method for auto angle setting of an infrared sensor module having a light emitting unit and a sensor unit arranged at a corner of a display panel, comprising the steps of:

turning on the light emitting unit;

sensing a light quantity at the sensor unit; and analyzing the light quantity sensed on a start pixel block and an end pixel block in the sensor unit of the infrared sensor module, to set a pixel which forms a greatest slope in the start pixel block as a start point and a pixel which forms a greatest slope in the end pixel block as an end point.

18. The method as claimed in claim 17, further comprising the step of setting a space between the pixels respectively set as the start point and the end point of the sensor unit in the infrared sensor module as an effective angle of view matched to 0° and 90°.

19. A display device, comprising:

a display panel;

at least two infrared sensor modules each having a light emitting unit and a sensor unit arranged at least two corners of the display panel;

a retro-reflective plate arranged at edges of the display panel; and a touch control unit having an auto angle setting unit for setting an effective angle of view with reference to pixels in the sensor unit of each of the infrared sensor modules which form impulses by light quantity sensed with a touch position detection unit which detects a touch position.

20. The display device as claimed in claim 19, wherein the retro-reflective plate at the corner having no infrared sensor module arranged thereto is diagonal treated.

21. The display device as claimed in claim 19, further comprising a case top having the infrared sensor modules and the retro-reflective plates arranged on an inside thereof to cover edges of the display panel.

* * * * *